L. W. BUXTON.

Bedstead Fastenings.

No. 5,447. Reissued June 17, 1873.

WITNESSES:
Elbridge Rogers
B. B. Whittemore

INVENTOR:
Levi W. Buxton

UNITED STATES PATENT OFFICE.

LEVI W. BUXTON, OF NASHUA, NEW HAMPSHIRE.

IMPROVEMENT IN BEDSTEAD-FASTENINGS.

Specification forming part of Letters Patent No. 23,525, dated April 5, 1859; extended seven years; reissue No. 5,447, dated June 17, 1873; application filed June 12, 1873.

*To all whom it may concern:*

Be it known that I, LEVI W. BUXTON, of Nashua, Hillsborough county, State of New Hampshire, have invented an Improved Bedstead-Fastening; and I do hereby declare that the following is a full, clear, and exact description thereof, reference being had to the accompanying drawings, and to the letters of reference marked thereon, and in which—

Figure 1:
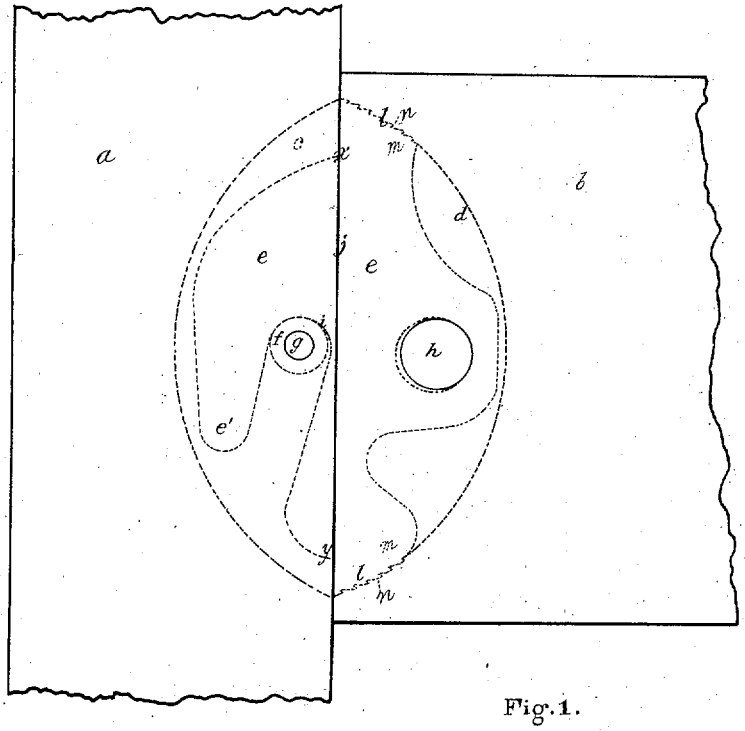
Figure 2:
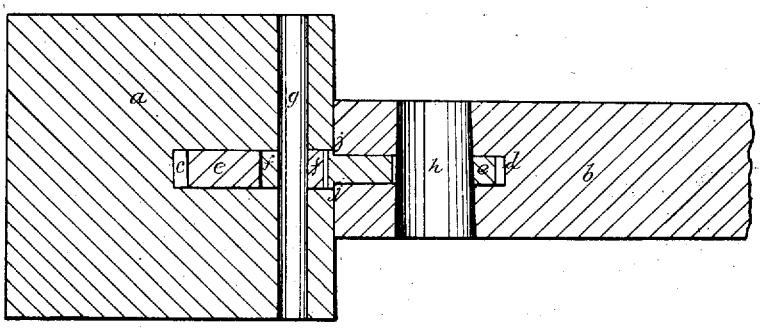

Figure 1 represents a side view of so much of a bedstead as is necessary to illustrate my invention; and Fig. 2 represents a cross-section through the device, a side view of which is shown in Fig. 1.

To enable those skilled in the art to which my invention belongs to make and use the same, I will proceed to describe it in detail.

The nature of my invention consists, first, in an improved rail-iron, as will be hereafter described; second, in the combination, with the grooved end of the rail, of a rail-iron constructed as hereafter described; and a tapering pin, substantially as and for the purposes hereafter set forth.

In the drawings, the part marked *a* represents a section of one of the posts of a bedstead, and *b* a section of one of the rails as they appear when my invention is employed to unite them to form a bedstead. The posts *a* and rails *b* are both grooved out, as seen at *c* and *d*, the grooves being cut by circular rotating instruments or cutters, so that the grooves in all the rails will be alike, and the grooves in all the posts will be alike, and consequently the rail-iron *e* will fit equally well in any of the grooves in any of the rails. The outline of the grooves *c* and *d* are indicated by dotted lines, Fig. 1. The piece *e* is made with shoulders *j j*, one on each side, along the lines *x y*; that is, the part which projects into the post is made slightly thicker than the part which projects into the rail. This mode of construction gives greater strength to the part which projects into the post to form the fastening or hook device, while the shoulders or reenforced part abut or come against the end of the rail, and thus tend to facilitate the more even and perfect insertion of the rail-iron into the rail. The ends of the rail iron *e* are made circular to fit and abut against a part of the top and bottom of groove *d* in the rail, and are the only parts which strike against the back of the groove. These curved ends are also provided with serrations as shown at *l l*, and which little teeth, being pressed or drawn into the wood which forms the top and bottom of groove *d*, make a perfectly tight fit, which leaves no room for dirt or vermin to settle in. The part of the rail-iron *e* which projects into the groove in the rail is provided or made with a hole corresponding with a slightly conical hole in the rail, and when the rail-iron is to be secured or attached to the rail, a conical pin *h* is driven through these holes in the rail and rail-iron, thus uniting the two parts in a substantial manner, as indicated in the drawings.

It will be noticed that the hole in the rail-iron is somewhat larger than the pin *h*, so that only the rear portion of the inner surface of the hole is pressed against by the pin, as indicated in the drawings; and the practical effect of this mode of construction is to draw the curved ends *m m* of the rail-iron firmly against the top and bottom curved parts *n n* of the groove in the rail. The end of the piece *e* which projects into the post is made into a hook, *e'*, which is to be slipped over the friction-roller *f* when it is desired to fasten the rail to the post. The circular part of the hook is a little larger than the circumference of the friction-roller as seen at *i*, so as to prevent the latter from being jammed. The friction-roller serves to ease the insertion of the hook, and to allow the hook to slide smoothly down until the circular portion of the hook rests upon the roller, when the rail will be drawn tight up to the post. If the pin *g* were employed without the friction-roller, the friction between the inner surface of the hook and the surface of the pin would work against and impede the insertion of the hook.

It will be seen that the piece *e* can be easily detached from the rail by simply knocking the pin *h* out, which is a great advantage in packing. The posts and rails can be packed nicely in boxes, nothing projecting from the posts or rails that could be knocked off, bent, or loosened.

Having described my improvements in bedstead fastenings, what I claim therein as new, and of my invention, and desire to secure by Letters Patent is—

1. A rail-iron for fastening or securing the ends of the rails to the posts of bedsteads, having two curved ends *m m* to fit the curved parts *n n* of the groove in the end of the rail, while its rear part is provided with a hole to receive a fastening-pin, and its front part with a projecting hook device to enter the post and retain the rail and post securely together.

2. The combination, with the rail-iron *e*, of the serrations or teeth *l l* and re-enforced parts *j j*, substantially as and for the purposes set forth.

3. The combination, with the end of a bedstead rail provided with curved grooved parts *n n*, and a rail-iron having curved ends *m m*, of a slightly conical or tapering fastening-pin, substantially as and for the purposes set forth.

LEVI W. BUXTON.

Witnesses:

ELBRIDGE ROGERS,

B. B. WHITTEMORE.